United States Patent
Sakai

(10) Patent No.: US 7,876,200 B2
(45) Date of Patent: Jan. 25, 2011

(54) IN-VEHICLE CALL APPARATUS

(75) Inventor: Hiroshi Sakai, Okazaki (JP)

(73) Assignee: Denso Corporation, Kariya (JP)

( * ) Notice: Subject to any disclaimer, the term of this patent is extended or adjusted under 35 U.S.C. 154(b) by 304 days.

(21) Appl. No.: 12/286,519

(22) Filed: Sep. 30, 2008

(65) Prior Publication Data

US 2009/0115584 A1    May 7, 2009

(30) Foreign Application Priority Data

Nov. 5, 2007 (JP) .............................. 2007-287432

(51) Int. Cl.
*B60Q 1/00* (2006.01)
(52) U.S. Cl. ............ 340/425.5; 340/426.1; 340/426.18; 340/441; 340/456; 340/636.1; 455/88
(58) Field of Classification Search ............... 340/425.5, 340/426.1, 426.18, 441, 445, 456, 636.1; 455/88
See application file for complete search history.

(56) References Cited

U.S. PATENT DOCUMENTS

| | | | |
|---|---|---|---|
| 6,728,605 B2 * | 4/2004 | Lash et al. | 701/1 |
| 6,871,067 B2 * | 3/2005 | Clark et al. | 455/428 |
| 7,176,810 B2 * | 2/2007 | Inoue | 340/905 |
| 2004/0012501 A1 * | 1/2004 | Mazzara et al. | 340/870.11 |
| 2008/0278345 A1 * | 11/2008 | Van Bosch et al. | 340/870.07 |

FOREIGN PATENT DOCUMENTS

| | | |
|---|---|---|
| JP | 2001-069566 | 3/2001 |
| JP | 2001-180444 | 7/2001 |
| JP | 2002-271252 | 9/2002 |
| JP | 2007-060142 | 3/2007 |
| JP | 2007-214756 | 8/2007 |
| JP | 2007-237913 | 9/2007 |

OTHER PUBLICATIONS

Office action dated Oct. 27, 2009 in corresponding Japanese Application No. 2007-287432.

* cited by examiner

*Primary Examiner*—Davetta W Goins
(74) *Attorney, Agent, or Firm*—Harness, Dickey & Pierce, PLC

(57) ABSTRACT

In an in-vehicle theft call apparatus, when a relevant vehicle is in a non-stopped state, an electric power supply from an in-vehicle battery is maintained to both a Cellular wireless section and a PCS wireless section. Thus, a wide range wireless communication area can be secured. In contrast, when the vehicle is in a stopped state, an electric power supply from the in-vehicle battery is maintained to only one of the Cellular wireless section and the PCS wireless section while being interrupted to the other. Thus, a communication signal can be transmitted appropriately in an event of call state; further, power consumption can be improved.

4 Claims, 2 Drawing Sheets

IN-VEHICLE CALL APPARATUS

CROSS REFERENCE TO RELATED APPLICATION

This application is based on and incorporates herein by reference Japanese Patent Application No. 2007-287432 filed on Nov. 5, 2007.

FIELD OF THE INVENTION

The present invention relates to an in-vehicle call apparatus equipped with multiple wireless sections operated by electric power supplied from an in-vehicle battery.

BACKGROUND OF THE INVENTION

An in-vehicle theft call apparatus is to determine the possibility of a theft and then transmit a theft call signal to a center apparatus. When the vehicle is in a stopped state, the electric power is supplied from the in-vehicle battery to a wireless section as operating power. This is because the wireless section needs to be maintained in the state ready for transmitting the theft call signal. A mobile phone has been recently equipped with multiple wireless sections such as a Cellular wireless section and a PCS wireless section, which have mutually different wireless communication areas, in order to secure a wide range wireless communication area.

In similarity, in order to secure the wide range wireless communication area during the traveling, an in-vehicle call apparatus may be equipped with multiple wireless sections having mutually different wireless communication areas. The multiple wireless sections may be constantly supplied with the electric power from the in-vehicle battery if the vehicle is in the stopped state. Such a configuration consumes more power rather than the configuration in which a single wireless section is supplied with the electric power from the in-vehicle battery. This is an issue to need to be solved. Patent document 1 discloses a technology in which a terminal device equipped with multiple wireless sections controls the operations of the multiple wireless sections by determining whether to be inserted into an in-vehicle adapter.

The technology in Patent document 1, however, does not solve the above-mentioned issue that multiple wireless sections mounted in a vehicle consumes more power in the stopped state.

Patent document 1: JP-2001-69556 A

SUMMARY OF THE INVENTION

It is an object of the present invention to provide an in-vehicle call apparatus having the following advantages. In a non-stopped state, a wide range wireless communication area can be secured. In a stopped state, a communication signal can be transmitted appropriately in an event of call state. Further, power consumption can be improved.

According to an example of the present invention, an in-vehicle call apparatus for a vehicle is provided as follows. A plurality of wireless sections are included and operated by electric power supplied from an in-vehicle battery. The wireless sections individually have mutually different wireless communication areas. A call state determination portion is included for determining whether a call state has occurred. A control section is included to control a electric power supply from the in-vehicle battery to each of the wireless sections, and maintains the electric power supply to at least one of the wireless sections to transmit a call signal when the call state is determined to have occurred. A stopped state determination portion is included to determine whether the vehicle is in a stopped state or in a non-stopped state. Herein, when the vehicle is determined to be in the non-stopped state, the control section maintains the electric power supply from the in-vehicle battery to at least two wireless sections among the plurality of wireless sections. When the vehicle is determined to be in the stopped state while the electric power supply is maintained to the at least two wireless sections, the control section maintains the electric power supply to at least one of the at least two wireless sections while interrupting the electric power supply to at least one of the at least two wireless sections.

Under the above configuration, when the vehicle is in the non-stopped state, a wide range wireless communication area is securable; when the vehicle is in the stopped state, a call signal can be transmitted appropriately, for example, in an event of a call state occurring because of a theft or violation. Further, power consumption can be improved.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
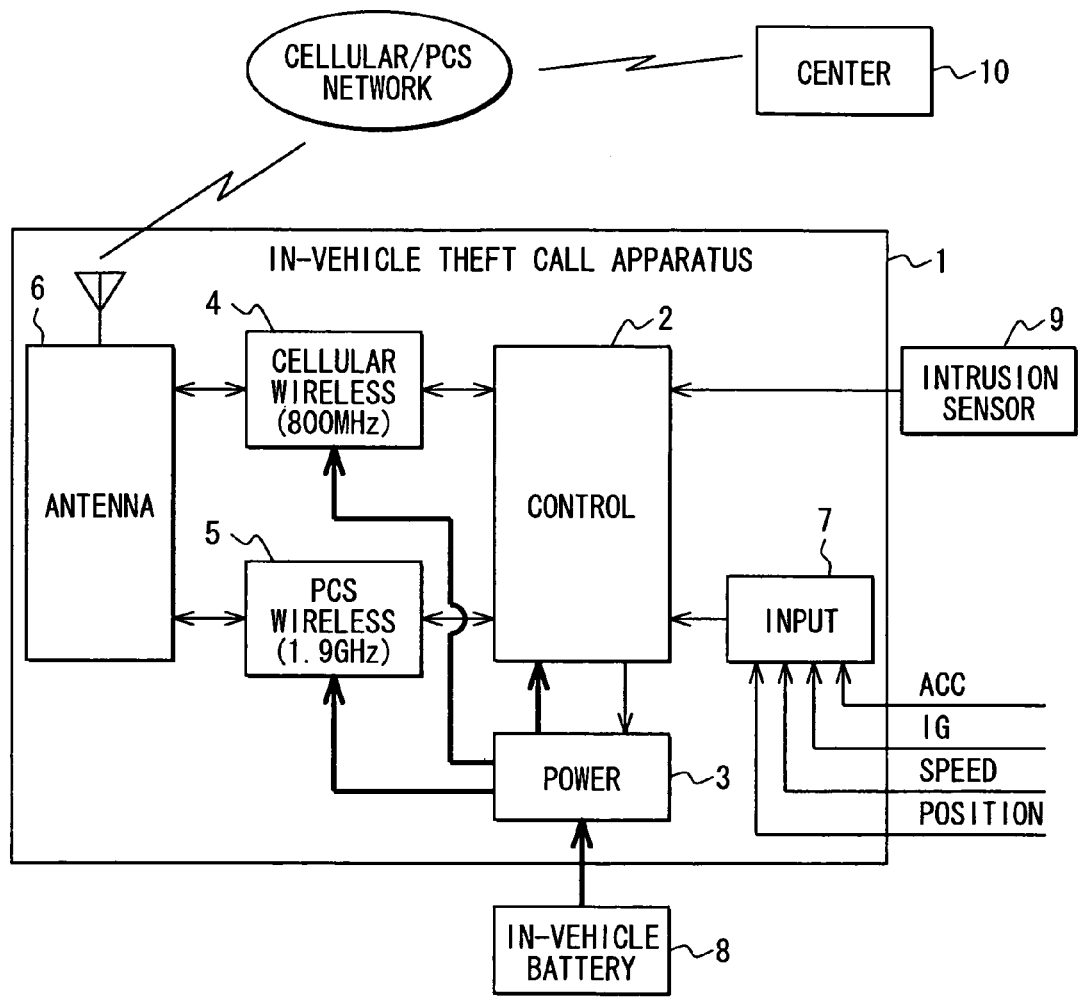
FIG. 1 is a functional block diagram according to an embodiment of the present invention.

An in-vehicle theft call apparatus according to an embodiment of the present invention is explained with reference to drawings. The in-vehicle call apparatus is to determine a possibility of a theft and transmit a theft call signal to a center apparatus. FIG. 1 illustrates a configuration of an in-vehicle theft call system in a functional block diagram. The in-vehicle theft call apparatus 1 includes a control section 2, a power section 3, a Cellular wireless section 4, a PCS (Personal Communication Services) wireless section 5, an antenna shared section 6, and a signal input section 7.

The control section 2 includes a CPU, RAM, ROM, and I/O bus. The control section 2 controls an overall operation of the in-vehicle theft call apparatus 1. The power section 3 transforms the electric power supplied from an in-vehicle battery 8 into a prescribed voltage. The electric power transformed into the prescribed voltage is supplied to the control section 2, the Cellular wireless section 4, the PCS wireless section 5, etc. The Cellular wireless section 4 operates with the electric power supplied via the power section 3 from the in-vehicle battery 8 as operating power, and performs a Cellular communication according to a communication method of a Cellular system. The PCS wireless section 5 operates with the electric power supplied via the power section 3 from the in-vehicle battery 8 as operating power, and performs a PCS communication according to a communication method of a PCS system.

The antenna shared section 6 sends transmission signals of a Cellular communication band, which are inputted from the Cellular wireless section 4, as radio wave signals via an antenna 6a and outputs radio wave signals of the Cellular communication band, which are received via the antenna 6a, to the Cellular wireless section 4. Further, the antenna shared section 6 sends transmission signals of a PCS communication band, which are inputted from the PCS wireless section 5, as radio wave signals via the antenna 6a, and outputs radio wave signals of the PCS communication band, which are received via the antenna 6a, to the PCS wireless section 5. In such a configuration, a wireless communication area formed by the Cellular wireless section 4 and a wireless communication area formed by the PCS wireless section 5 overlap with each other in a spot (referred to as an overlap spot) and do not overlap in another spot (referred to as a non-overlap spot). The control section 2 uses a roaming function in the non-overlap spot, where two communication areas do not overlap, to thereby secure a wide range wireless communication area.

The signal input section 7 receives IG (ignition) signals indicating turning on and off of an ignition, ACC (accessory) signals indicating turning on and off of an accessory from a key switch, speed signals (vehicle speed pulses) indicating a speed from a speed sensor, and position signals indicating a vehicle position from a GPS (Global Positioning System) receiver, for instance. The signal input section 7 then outputs the received various signals to the control section 2. The control section 2 determines whether the vehicle is in a stopped state (or a parked state) based on the various signals inputted from the signal input section 7. For example, the control section 2 determines that the vehicle is in the stopped state (or parked state) in the following conditions: based on IG signals, the ignition is determined to be turned off; based on speed signals, the vehicle speed is determined to be "0"; and based on position signals, the vehicle position is determined to have not been changed. In contrast, for example, the control section 2 determines that the vehicle is in the non-stopped state (or run state) in the following conditions: based on IG signals, the ignition is determined to be turned on; based on speed signals, the vehicle speed is determined to be not "0"; and based on position signals, the vehicle position is determined to have been changed. Further, the control section 2 need not determine the various signals in an integrated manner as above. For example, whether the vehicle is in the stopped state or non-stopped state may be determined only based on the IG signal. Alternatively, it can be determined only based on the vehicle position signal. In addition, the stopped state or parked state can be defined as a state in which a user or driver is separated from the vehicle.

An intrusion sensor 9 is provided at an outside of the in-vehicle theft call apparatus 1. The intrusion sensor 9 detects whether a suspicious person invades into the vehicle. When it is detected that a suspicious person invades into the vehicle, a detection signal is outputted to the in-vehicle theft call apparatus 1. When the detection signal is inputted from the intrusion sensor 9, the control section 2 functions as an example of a call state determination means or portion to determine a possibility of a theft, and transmit a theft call signal to a center apparatus 10 by using whichever the Cellular wireless section 4 or the PCS wireless section 5 being in an operating state.

Figure 2:
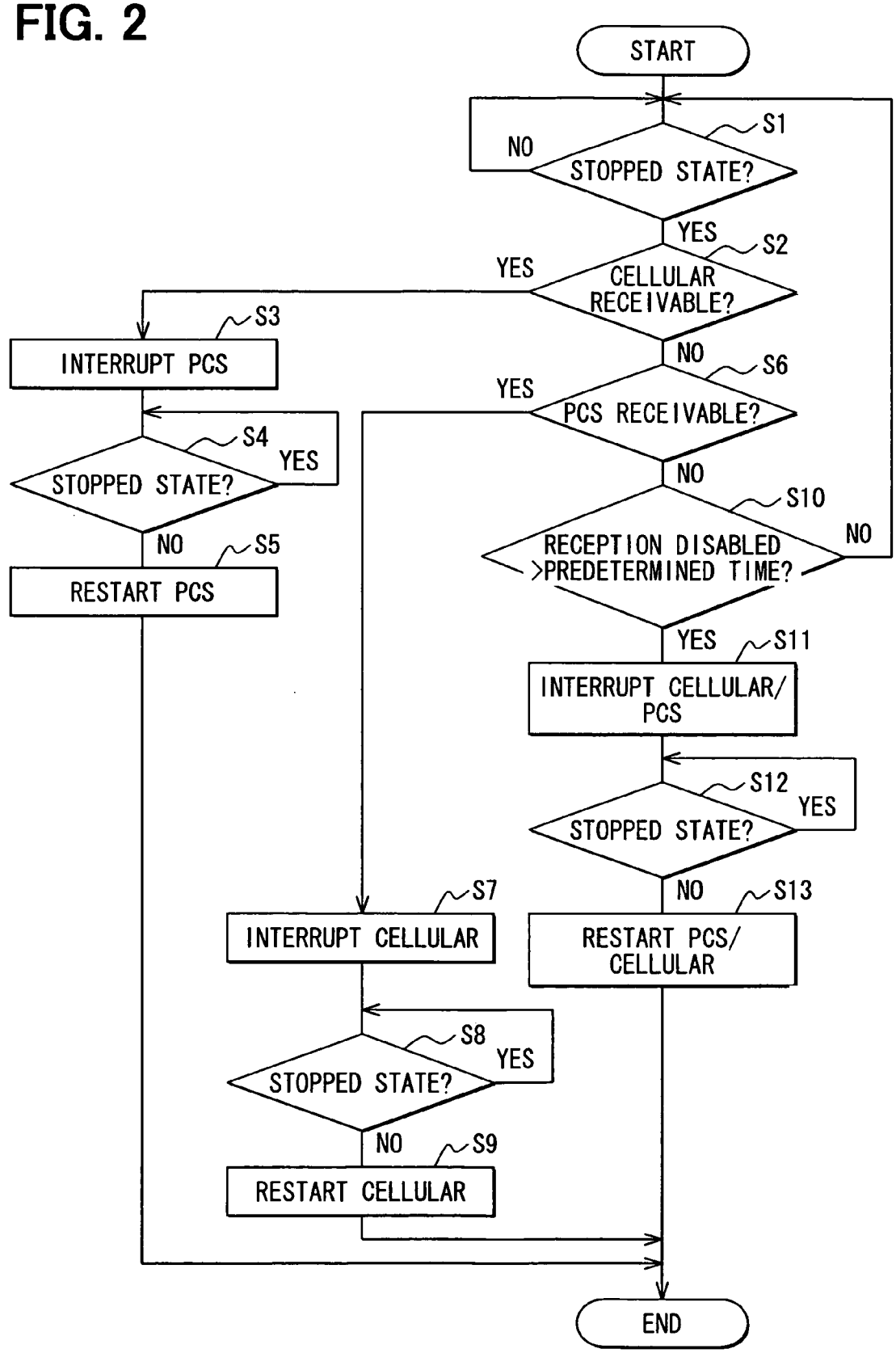
FIG. 2 is a flowchart diagram.

An operation under the above configuration is explained with reference to FIG. 2. FIG. 2 illustrates a flowchart of a process executed by the control section 2. The control section 2 repeats the process while the electric power is supplied from the power section 3. First, the control section 2 functions as an example of a vehicle state or stopped state determination means or portion to determine or monitor at S1 whether the vehicle is in the stopped state. When the control section 2 determines that the vehicle is in the stopped state (S1: YES), it is determined at S2 whether the Cellular wireless section 4 is able to receive radio wave signals of the Cellular communication band from the Cellular communication network.

When the control section 2 determines that the Cellular wireless section 4 is able to receive radio wave signals (S2: YES), the control section 2 interrupts the electric power supply from the in-vehicle battery 8 to the PCS wireless section 5 to thereby stop an operation of the PCS wireless section 5 at S3. That is, the control section 2 operates only the Cellular wireless section 4 in the standby state among the Cellular wireless section 4 and the PCS wireless section 5. While operating only the Cellular wireless section 4 in the standby state, a detection signal may be inputted from the intrusion sensor 9. In such a case, a theft call signal is transmitted to the center apparatus 10 via the Cellular wireless section 4.

Subsequently, the control section 2 determines whether the vehicle in the stopped state at S4. When the control section 2 determines that the vehicle is not in the stopped state (S4: NO), the control section 2 re-starts the electric power supply from the in-vehicle battery 8 to the PCS wireless section 5, to which the electric power supply has been interrupted, to thereby re-start an operation of the PCS wireless section 5 at S5. The process once ends. The process is repeated from S1 while the control section 2 is supplied with the power from the power section 3. That is, the control section 2 operates both the Cellular wireless section 4 and the PCS wireless section 5 in the standby state.

When the control section 2 determines that the Cellular wireless section 4 is not able to receive radio wave signals (S2: NO), it is determined at S6 whether the PCS wireless section 5 is able to receive radio wave signals of the PCS communication band from the PCS communication network. When it is determined that the PCS wireless section 5 is able to receive radio wave signals of the PCS communication band (S6: YES), the control section 2 interrupts the electric power supply from the in-vehicle battery 8 to the Cellular wireless section 4 to thereby stop an operation of the Cellular wireless section 4 at S7. That is, the control section 2 operates only the PCS wireless section 5 in the standby state among the Cellular wireless section 4 and the PCS wireless section 5. While operating only the PCS wireless section 5 in the standby state, a detection signal may be inputted from the intrusion sensor 9. In such a case, a theft call signal is transmitted to the center apparatus 10 via the PCS wireless section 5.

Subsequently, the control section 2 determines at S8 whether the vehicle in the stopped state. When the control section 2 determines that the vehicle is not in the stopped state (S8: NO), the control section 2 re-starts the electric power supply from the in-vehicle battery 8 to the Cellular wireless section 4, to which the electric power supply has been interrupted, to thereby re-start an operation of the Cellular wireless section 4 at S9. The process once ends. The process is repeated from S1 while the control section 2 is supplied with the power from the power section 3. That is, the control section 2 operates both the Cellular wireless section 4 and the PCS wireless section 5 in the standby state.

In contrast, when it is determined that the PCS wireless section 5 is not able to receive radio wave signals of the PCS communication band (S6: NO), the control section 2 determines at S10 whether a reception disabled time period for each wireless sections 4, 5 elapses a predetermined time period. Herein, the reception disabled time period is defined as a time period for which each wireless section 4, 5 is unable or disabled to receive radio wave signals of the relevant communication band. When it is determined that the reception disabled time periods for both wireless sections 4, 5 elapse the predetermined time period (S10: YES), the control section 2 interrupts the electric power supply from the in-vehicle battery 8 to both the Cellular wireless section 4 and the PCS wireless section 5 to stop the operations of both the Cellular wireless section 4 and the PCS wireless section 5 at S11. That is, the control section 2 does not operate thereafter both the PCS wireless section 5, which is unable to receive radio wave signals of the Cellular communication band, and the PCS wireless section 4, which is unable to receive radio wave signals of the PCS communication band, in the standby state.

Subsequently, the control section 2 determines whether the vehicle is in the stopped state at S12. When the control section 2 determines that the vehicle is not in the stopped state (S8: NO), the control section 2 re-starts the electric power supply from the in-vehicle battery 8 to both the Cellular wireless section 4 and the PCS wireless section 5, to which the electric power supply has been interrupted, to thereby re-start the operations of both the Cellular wireless section 4 and the PCS wireless section 5 at S13. The process once ends. The process is repeated from S1 while the control section 2 is supplied with the power from the power section 3. That is, the control section 2 operates both the Cellular wireless section 4 and the PCS wireless section 5 in the standby state.

Further, in the above explanation, It is determined first whether the Cellular wireless section 4 is able to receive radio wave signals of the Cellular communication band. When the Cellular wireless section 4 is unable to receive radio wave signals of the Cellular communication band, it is determined subsequently whether the PCS wireless section 5 is able to receive radio wave signals of the PCS communication band. Alternatively, it may be determined first whether the PCS wireless section 5 is able to receive radio wave signals of the PCS communication band. When it is determined that the PCS wireless section 5 is unable to receive, it may be determined subsequently whether the Cellular wireless section 4 is able to receive radio wave signals of the Cellular communication band. Such a determination order can be previously set and recorded based on differences in the communication area, communication fee, reception sensitivity, or power consumption. The control section 2 determines whether to be able to receive relevant radio wave signals according to the determination order previously recorded.

As explained above, in the in-vehicle theft call apparatus 1 according to the present embodiment, when the vehicle is in the non-stopped state (run state), the control section 2 maintains the electric power supply from the in-vehicle battery 8 to both the Cellular wireless section 4 and the PCS wireless section 5. A wide range wireless communication area can be thus securable. In contrast, when the vehicle is in the stopped state, the control section 2 maintains the electric power supply from the in-vehicle battery 8 to one of the Cellular wireless section 4 and the PCS wireless section 5 while interrupting the electric power supply to the other. When a possibility of occurrence of a theft is expected, a theft call signal can be transmitted appropriately. Further, power consumption can be reduced.

Moreover, thereafter, when the vehicle state moves to the non-stopped state or run state, the control section 2 re-starts the electric power supply to the wireless section, to which the electric power supply has been interrupted. Thus, the state before the vehicle state is moved to the stopped state can be restored promptly, and the wide range wireless communication area can be secured.

In addition, if both the Cellular wireless section 4 and the PCS wireless section 5 cannot transmit any theft call signal in the stopped state of the vehicle, the control section 2 interrupts the electric power supply from the in-vehicle battery 8 to both the Cellular wireless section 4 and the PCS wireless section 5. Such a configuration can prevent unnecessary power consumption due to maintaining the electric power supply to the Cellular wireless section 4 and the PCS wireless section 5, both of which cannot transmit any theft call signal.

Furthermore, if the vehicle state is moved to the non-stopped state after having interrupted the electric power supply to both the Cellular wireless section 4 and the PCS wireless section 5, the electric power supply is re-started to the wireless section, to which the electric power supply has been interrupted. The state before the vehicle state is moved to the stopped state can be thus restored promptly, and the wide range wireless communication area can be secured.

The present invention is not limited only to the above-mentioned embodiment, and can be modified or extended as follows. The present invention can be directed not only to an in-vehicle theft call apparatus to determine the possibility of a theft and then transmit a theft call signal to a center apparatus, but also to another apparatus or method to determine an act disadvantageous for a user or vehicle owner such as a violation to thereby transmit a call signal to a center apparatus. The signal which determines whether the vehicle is in the stopped state can include a seating signal indicating whether a driver is seated in the driver's seat in addition to the ACC signal, IG signal, speed signal, and position signal, for example. Another embodiment can have a configuration to include three or more wireless sections to form individually different wireless communication areas. In such a case, in the non-stopped state, the electric power supply from the in-vehicle battery to at least two wireless sections is maintained to thereby secure a wider range wireless communication area. In contrast, in the stopped state, while being maintained to at least one wireless section, the electric power supply is interrupted to the at least one wireless section. This allows a call signal to be transmitted appropriately in an event of a call state occurring because of a theft or violation. Further, power consumption can be reduced.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An in-vehicle call apparatus for a vehicle, the apparatus comprising:
    a plurality of wireless sections individually having mutually different wireless communication areas, the wireless sections being operated by electric power supplied from an in-vehicle battery;
    a call state determination portion for determining whether a call state has occurred;
    a control section that controls a electric power supply from the in-vehicle battery to each of the wireless sections, and maintains the electric power supply to at least one of the wireless sections to transmit a call signal when the call state is determined to have occurred; and
    a stopped state determination portion for determining whether the vehicle is in a stopped state or in a non-stopped state,
    wherein:
    when the vehicle is determined to be in the non-stopped state, the control section maintains the electric power supply from the in-vehicle battery to at least two wireless sections among the plurality of wireless sections; and when the vehicle is determined to be in the stopped state while the electric power supply is maintained to the at least two wireless sections, the control section maintains the electric power supply to at least one of the at least two wireless sections while interrupting the electric power supply to at least one of the at least two wireless sections.

2. The in-vehicle call apparatus according to claim 1, wherein when the vehicle is determined to be in the non-stopped state after interrupting the electric power supply to the at least one of the at least two wireless sections, the control section re-starts the electric power supply to the at least one of the at least two wireless sections to which the electric power supply has been interrupted.

3. The in-vehicle call apparatus according to claim 1, wherein if the plurality of wireless sections are unable to transmit a communication signal when the vehicle is determined to be in the stopped state, the control section interrupts the electric power supply from the in-vehicle battery to the plurality of wireless sections.

4. The in-vehicle call apparatus according to claim 3, wherein when the vehicle is determined to be in the non-stopped state after the control section interrupts the electric power supply from the in-vehicle battery to the plurality of wireless sections, the control section re-starts the electric power supply to the plurality of wireless sections to which the electric power supply has been interrupted.

* * * * *